United States Patent [19]

Drake

[11] 3,893,110
[45] July 1, 1975

[54] DEVICE FOR CONVERSION AND DISPLAY OF RADAR RETURNS

[75] Inventor: David L. Drake, Treasure Cove, Md.

[73] Assignee: The United States of America as represented by the Secretary of the Navy, Washington, D.C.

[22] Filed: May 27, 1965

[21] Appl. No.: 459,986

[52] U.S. Cl. .............. 343/5 EM; 315/378; 315/383
[51] Int. Cl. ............................................. G01s 7/04
[58] Field of Search......... 343/5 EI, 11, 17.1, 5 EM, 343/17.1 R; 315/378, 383, 30

[56] References Cited
UNITED STATES PATENTS
2,462,859   3/1949   Grieg ................................ 343/17.1
3,183,505   5/1965   Strauss ................................. 343/11

Primary Examiner—Maynard R. Wilbur
Assistant Examiner—G. E. Montone
Attorney, Agent, or Firm—R. S. Sciascia; Arthur L. Branning

EXEMPLARY CLAIM

1. A display system for enhancing some patterns and suppressing other patterns comprising:
   display means having an intensity and two orthogonal input terminals;
   sweep signal generator means coupled to one of said two orthogonal input terminals;
   signal input means;
   clipping means connected to said signal input means;
   logarithmic variation means connected to said clipping means;
   first differential amplifier means connected to said signal input means and to said logarithmic variation means;
   second differential amplifier means connected to said first differential amplifier means, to said sweep signal generator means and to the other of said two orthogonal input terminals and
   third differential amplifier means connected to said signal input means, to said logarithmic variation means and to said intensity input terminal.

6 Claims, 2 Drawing Figures

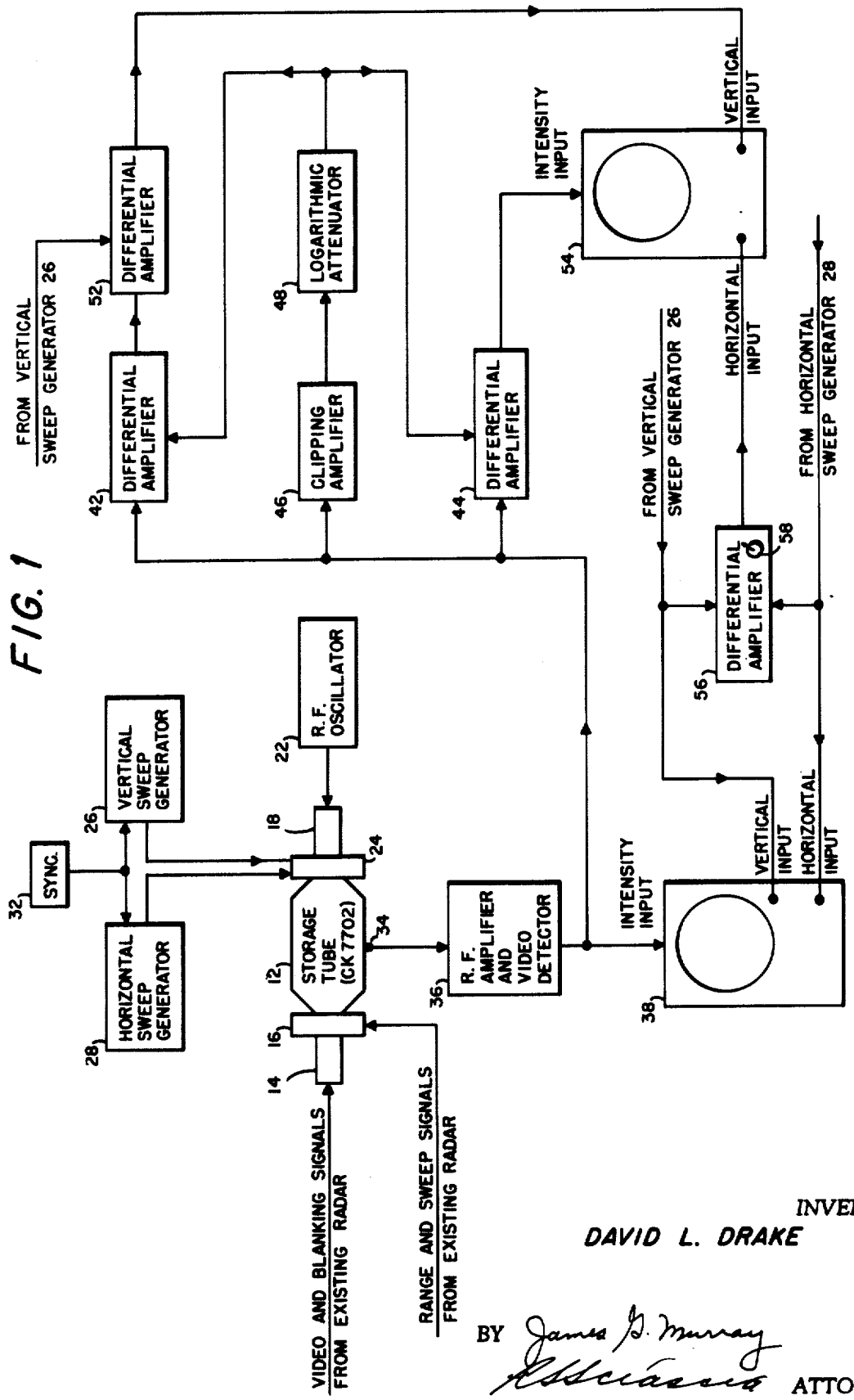

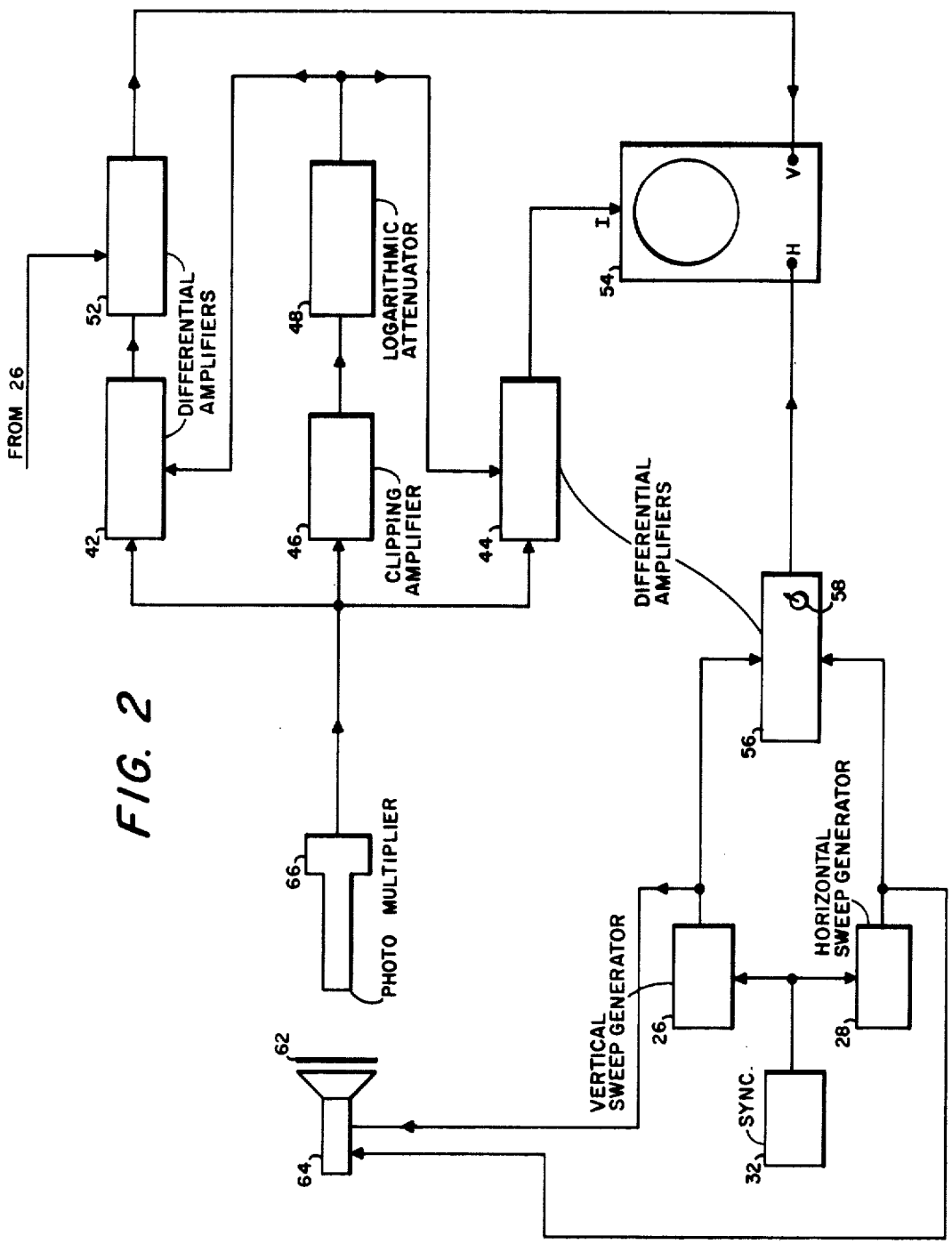

DEVICE FOR CONVERSION AND DISPLAY OF RADAR RETURNS

The invention described herein may be manufactured and used by or for the Government of the United States of America for governmental purposes without the payment of any royalties thereon or therefor.

The present invention relates to apparatus for displaying radar returns and more particularly to an electronic system wherein radar signals obtained by scanning the sea are displayed in such a manner that the wakes of ships and submarines are more easily perceived by the observer.

One of the most pressing problems of national security, both in war and peace, is surveillance of the water surfaces of the earth. Radar, mounted on patrol aircraft, has been widely and effectively used for this purpose. There are, however, occasions and circumstances when detection of seacraft cannot be accomplished by the conventional use of radar. At these times it is desirable to examine the radar sea returns for wake patterns.

Prior to the present invention the examination of radar sea return for wake patterns, either directly from the conventional oscilloscope display or from photographs thereof, was extremely difficult because the random sea return, or clutter, obscures the wake pattern.

The general purpose of this invention is to provide apparatus which can be used to enhance the wake pattern and suppress the random sea return and is in general compatible with existing radar and therefore retains the aforedescribed advantages of prior sea surveillance systems.

An object of the present invention is, therefore, the provision of improved apparatus for surveillance of the sea.

Another object is the provision of apparatus which enables a radar operator to more easily identify wake patterns in radar sea return.

A further object is to provide an improved electronic system, suitable for use with existing radar, for examining radar sea return for wake patterns.

A still further object is to provide an improved electronic system, suitable for use with existing radar, which can be used to enhance a wake pattern and suppress random sea return in a radar display.

Other objects and many of the attendant advantages of this invention will be readily appreciated as the same becomes better understood by reference to the following detailed description when considered in connection with the accompanying drawings in which like reference numerals designate like parts throughout the figures and wherein:

FIG. 1 shows in block diagram form an embodiment of the invention and

FIG. 2 shows in block diagram form another embodiment of the invention.

Referring now to the drawings, wherein like reference characters designate like or corresponding parts, there is shown in FIG. 1 a storage tube 12, such as a Raytheon CK7702 double ended storage tube or its equivalent, of which there are several available commercially. Since storage tube 12 is a commercially known item, its detail structure will be described only to the extent necessary for the comprehension of this specification.

Basically tube 12 is a two gun tube wherein the input of "write" gun is located in end 14 of tube 12. The input gun is connected to the video and blanking signals of an existing radar system and shoots an electron beam representative of these signals toward the center portion of tube 12. This beam is controlled by yoke 16 which is connected to receive the range and sweep signals from the existing radar and which functions to direct the input gun beam onto a storage screen which is not shown. The second or "read" gun is located in the opposite end 18 of tube 12 and also shoots an electron beam toward the center of the tube. This beam is modulated by an RF oscillator 22, typically operating at 30 Mc, and is controlled by rotatable yoke 24 which is connected to vertical sweep generator 26 and horizontal sweep generator 28 which are synchronized by circuit 32, all of which are conventional in function and structure. The read beam is swept and biased in such a manner that it passes through the storage screen without touching the screen and impinges on a collector which is not shown and which is connected to the output terminal 34 of tube 12.

It is of interest to note that the screen is of fine mesh wire coated with dielectric and is initially flooded with electrons. The write beam causes some secondary emission which is also collected on the collector. This secondary emission voltage is separable from the read beam voltage because the latter is at RF. This separation, as well as necessary amplification and video detection is accomplished by conventional circuitry in the component box identified by numeral 36.

The output of component 36 is connected to the intensity grid of conventional scope display device 38 which also is connected to receive vertical and horizontal sweep signals from sweep generators 26 and 28. Display device 38 functions as a monitor and presents a somewhat conventional intensity modulated visual indication of the information stored on the screen of tube 12. The presentation of display device 38 is not entirely conventional, however, because of the inherent integrating characteristic of tube 12 which results in device 38 providing a time history of a moving target wherein the target trail is indicative of the direction and the magnitude of the target velocity. In most of the commercially available tubes suitable for use as tube 12, the integrating characteristic, or more precisely the rate of the storage screen decay, is adjustable.

The output of component 36 is also applied to differential, or algebraic amplifiers 42 and 44 and to clipping amplifier 46. The latter amplifier is connected to logarithmic attenuator 48 which is in turn connected both to amplifier 42 and to amplifier 44. The output of amplifier 42 is connected to differential amplifier 52 which also receives the signal from the vertical sweep generator 26. The output of differential amplifier 52 is connected to the vertical input terminal of the conventional scope display device 54. The output of differential amplifier 44 is connected to the intensity input terminal of display device 54. Signals from the sweep generators 26 and 28 are combined in adjustable proportion in differential amplifier 56 and then applied to the horizontal input of display device 54. The mixing proportion of the sweep generator signals is adjusted by means of control 58 to thereby cause varying degrees of obliqueness in the presentation of display device 54 which is often useful in enhancing certain patterns and suppressing other patterns.

The above described embodiment of the invention illustrated in FIG. 1 is capable of providing an immediate presentation of the area being scanned by radar. In some instances, such as the absence of an operator skilled in using the apparatus of FIG. 1, it may be desirable to place the radar return on a photographic transparancy for storage and later interpretation. The embodiment of the invention illustrated in FIG. 2 is useful for this purpose.

In FIG. 2, a photographic transparancy 62 of conventional radar sea return is mounted in front of a conventional cathode ray tube 64 which is controlled by the vertical and horizontal sweep generators 26 and 28 that are synchronized by circuit 32. The light from the trace of the CRT 64 is intensity modulated by the transparancy 62 and energizes photomultiplier tube 66, the output of which is connected to differential amplifiers 42 and 44 and to clipping amplifier 46. The remainder of the embodiment in FIG. 2 is identical to the corresponding portion of the embodiment of FIG. 1.

Although the transparancy 62 has been described as being a photograph of radar sea return, it should be recognized that the embodiment of FIG. 2 can be used in combination with transparancies of other subject matter. For example, a transparancy of a topographic map can be used to produce an apparent oblique three dimensional map.

An interesting variation of the invention is obtained if display device 54 utilizes a double layer phosphor CRT wherein the spectral response of the two layers differ. Brilliant white wake patterns against a green background have been obtained which are very similar to sea views actually seen by eye.

In using the systems of FIGS. 1 and 2, the skill and experience of the operator will be of considerable importance since there are no precise manipulative rules which can be given. In general, the operator must rotate the input information relative to the scanning, either by rotating the yoke 24 of FIG. 1 or by rotating the transparancy 62 of FIG. 2, while manipulating the control 58 or amplifier 56, until such time as the display of device 54 is optimized, at which time the random sea return will be suppressed and the desired wake pattern will be more easily perceived by the operator than it would be with equipment used prior to this invention.

Briefly the theory of the invention is that the "clip and log" processing (components 46 and 48) will operate on a signal in two ways. The processing will selectively attenuate a small signal, such as random sea return, with respect to a large signal, such as wake return, and the processing will also reduce the width of all signals; the terms "narrow" and "wide" being used herein to denote the relative width of signals as they would customarily appear in a conventional display. If a relatively narrow signal, such as from random sea return, is further narrowed by the processing, changes of sufficient magnitude will occur to the frequency components of the signal that it will be eliminated by the bandwidth limitations of the system. The invention contemplates using both the attenuation and narrowing effects of the processing to enhance the desired pattern and eliminate undesired patterns.

The processing effects are further made use of by the scan rotation feature of the invention. By proper selection of the angle of scan, the operator is able to scan a signal return, which is broad in one direction and narrow in another, along either the broad or narrow direction and thereby cause the previously described processing to selectively enhance or eliminate the signal. The rotation of the scan also is effective, since the video is introduced on the vertical input of the display, in effecting the elimination or enhancement of patterns by interference of the information with itself.

It will be apparent that there have been disclosed embodiments of an invention which can be used with existing radar to enhance wake patterns and suppress random sea return in a visual display and which, if desired, can be used with other information inputs to provide presentations which accentuate certain features of the input. Obviously many modifications and variations of the invention are possible in the light of the above teachings. For example, various stages of signal inversion and the use of a logarithmic amplifier in place of attenuator 48 are obvious expedients which would occur to those skilled in the art to provide variations of the display presented. It is therefore to be understood, that within the scope of the appended claims, the invention may be practiced otherwise than as specifically described.

What is claimed and desired to be secured by Letters Patent of the United States is:

1. A display system for enhancing some patterns and suppressing other patterns comprising:
   display means having an intensity and two orthogonal input terminals;
   sweep signal generator means coupled to one of said two orthogonal input terminals;
   signal input means;
   clipping means connected to said signal input means;
   logarithmic variation means connected to said clipping means;
   first differential amplifier means connected to said signal input means and to said logarithmic variation means;
   second differential amplifier means connected to said first differential amplifier means, to said sweep signal generator means and to the other of said two orthogonal input terminals and
   third differential amplifier means connected to said signal input means, to said logarithmic variation means and to said intensity input terminal.

2. A display system as set forth in claim 1 wherein said signal input means includes a storage tube comprising:
   a storage screen;
   writing means connected to receive an information signal and to place said information signal on said storage screen;
   an output terminal coupled to said clipping means and to said first and third differential amplifier means and
   reading means connected to said sweep generator means to transfer said information signal to said output terminal.

3. A display system as set forth in claim 2 wherein said reading means includes an RF oscillator and a rotatable yoke connected to said sweep generator means and wherein a video amplifier and detector is coupled between said output terminal and said clipping, first and third differential amplifier means.

4. A display system as set forth in claim 3 wherein said logarithmic variation means is a logarithmic attenuator.

5. A display system as set forth in claim 1 wherein said signal input means comprises:

a photomultiplier tube having an output connected to said clipping means and to said first and third differential amplifier;

a cathode ray tube connected to said sweep generator means and a photographic transparancy rotatably located between said cathode ray tube and said photomultiplier tube.

6. A display system as set forth in claim 5 wherein said logarithmic variation means is a logarithmic attenuator.